(12) United States Patent
Molde et al.

(10) Patent No.: US 6,769,325 B2
(45) Date of Patent: Aug. 3, 2004

(54) SHIFT BIASED DETENT PROFILE

(75) Inventors: Dean Molde, Pinehurst, NC (US); Patrick Scheib, Pinehurst, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 10/078,633

(22) Filed: Feb. 19, 2002

(65) Prior Publication Data

US 2003/0154813 A1 Aug. 21, 2003

(51) Int. Cl.$^7$ .............................. F16D 23/06; G05G 5/06
(52) U.S. Cl. .............................. 74/473.28; 74/473.21; 74/527
(58) Field of Search .................... 74/473.27, 473.28, 74/473.21, 527, 531

(56) References Cited

U.S. PATENT DOCUMENTS

| | | | | |
|---|---|---|---|---|
| 2,131,263 A | * | 9/1938 | Barnes | 74/473.21 |
| 4,338,828 A | * | 7/1982 | Ruhlman | 74/473.27 |
| 4,704,916 A | * | 11/1987 | Wilhelmy | 74/473.26 |
| 5,085,303 A | * | 2/1992 | Frost | 192/53.32 |
| 5,309,783 A | * | 5/1994 | Doolittle et al. | 74/473.21 |
| 2001/0017063 A1 | * | 8/2001 | Wildeshaus et al. | 74/473.29 |

* cited by examiner

*Primary Examiner*—David A. Bucci
*Assistant Examiner*—Bradley J. Van Pelt
(74) *Attorney, Agent, or Firm*—Carlson, Gaskey & Olds, P.C.

(57) ABSTRACT

A detent assembly for a transmission is provided including a transmission component, such as a shift rail, movable between a plurality of shift positions including first, second, and neutral shift positions. A contoured surface on the shift rail includes first and second recesses, respectively, corresponding to the first and second shift positions. A neutral recess is arranged between the first and second shift recesses corresponding to the neutral shift position. The first and second recesses, respectively, include first and second transition surfaces sloping towards the neutral recess with the second transition surface being steeper than the first transition surface. A detent assembly includes a biasing member and a detent member with the biasing member urging the detent member into engagement with the contoured surface. The biasing member generates a first work along the first transition surface and a second force along the second transition surface greater than the first work.

13 Claims, 2 Drawing Sheets

SHIFT BIASED DETENT PROFILE

BACKGROUND OF THE INVENTION

This invention relates to a shift detent assembly for a transmission, and more particularly, the invention relates to a shift detent to be used on manual transmission shift rails.

Manual transmissions are widely used in commercial trucks. Many transmission, engine, and driveline combinations, each of which may have several different lengths, are available to commercial truck consumers to meet their particular needs. As a result, the overall length of the driveline varies depending upon the particular combination.

A shift lever extends from the manual transmission into the vehicle cab and terminates with a knob in a location proximate the vehicle operator. The shift lever may be up to two to three feet in length. The driver moves a shift lever through a shift pattern. For balanced shift feel, the shift lever is configured so that it extends vertically from the shift lever pivot such that the center of gravity of the shift lever is over the shift lever's pivot.

A detent assembly, which is in engagement with a transmission component, such as a shift rail, provides a shift feel to the vehicle operator during gear shifts and maintains the desired gears in engagement with one another. However, to accommodate the various powertrain combinations, the shift lever must be bent in such a manner to place the knob proximate to the vehicle operator. Vehicle vibrations acting at the center of gravity of the bent shift lever may cause an undesirable condition commonly known as "jump out". Jump out occurs when the detent mechanism is unable to retain the shift rail in the selected position because of vibratory forces exerted by the shift lever on the shift rail. As a result, the selected gear becomes disengaged. A particular shift lever geometry may typically make the transmission susceptible to jump out in a particular direction. Therefore, what is needed is a detent assembly that prevents jump out in applications using a particular shift lever.

SUMMARY OF THE INVENTION AND ADVANTAGES

The present invention provides a detent assembly for a transmission including a transmission component, such as a shift rail, movable between a plurality of shift positions including first, second, and neutral shift positions. A contoured surface on the shift rail includes first and second recesses, respectively, corresponding to the first and second shift positions. A neutral recess is arranged between the first and second shift recesses corresponding to the neutral shift position. The first and second recesses, respectively, include first and second transition surfaces sloping towards the neutral recess with the second transition surface being steeper than the first transition surface. A detent assembly includes a biasing member and a detent member with the biasing member urging the detent member into engagement with the contoured surface. The biasing member generates a first force along the first transition surface and a second force along the second transition surface that increases at a greater rate than that of the first force. Said another way more work is required to move detent assembly out of the second recess than the first recess.

In this manner, a certain force versus rail displacement profile set may be generated to prevent jump out of first. Likewise, an opposite profile set may be generated to prevent jump out of second.

In addition to the symmetrical profile used for levers not prone to jump out, the above invention provides two shift rails with opposite, non-symmetrical profiles that can be used to prevent jump out with problematic shift levers.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1A:
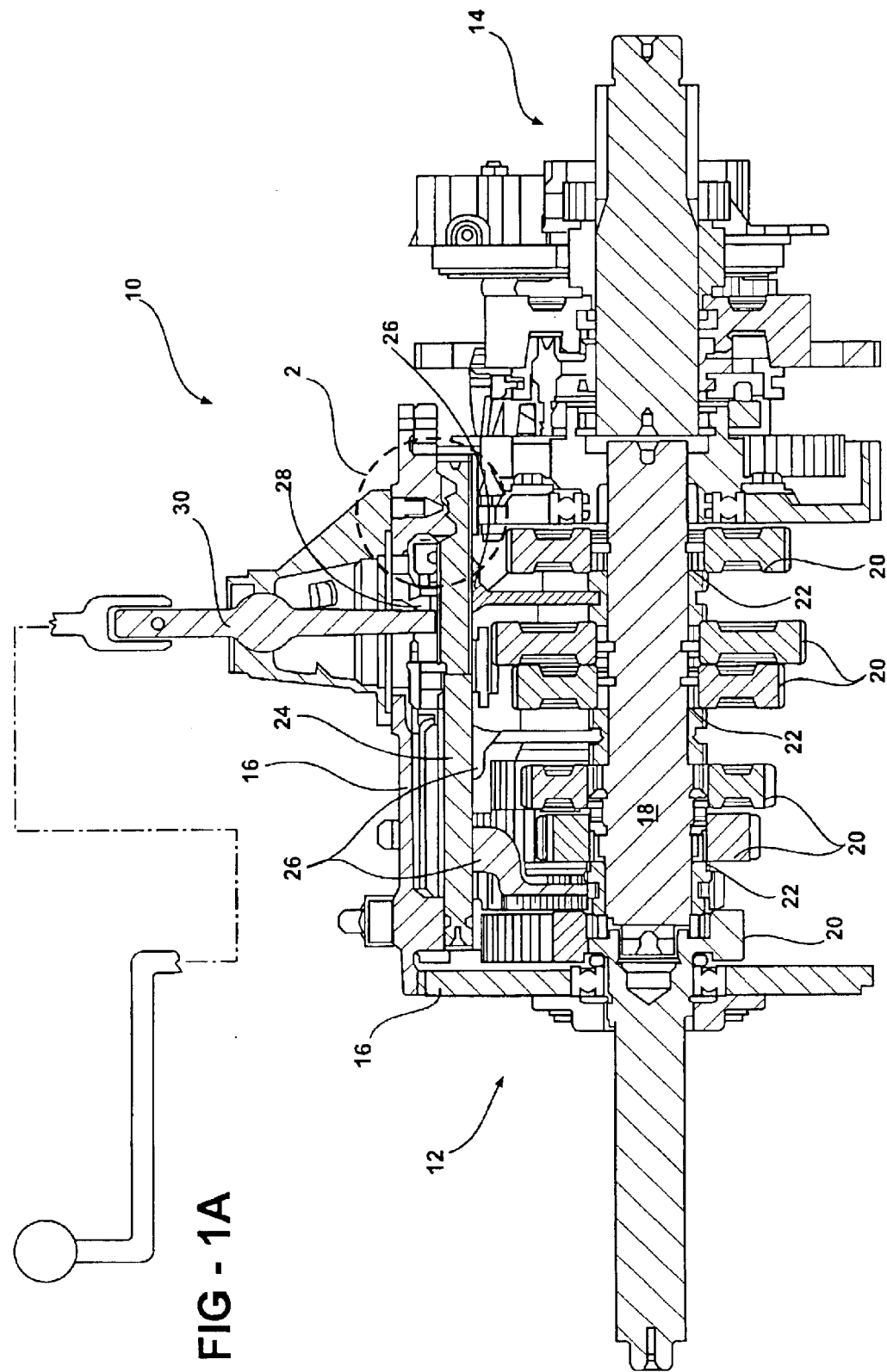
FIG. 1A is a cross-sectional view of a portion of a manual transmission.
Figure 1B:
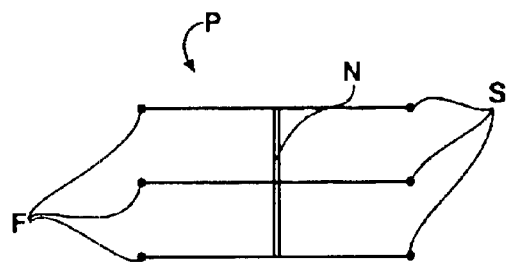
FIG. 1B is a schematic view of a shift pattern for the manual transmission shown in FIG. 1A.

A manual transmission 10 is shown in FIG. 1A and includes a forward end 12 and a rearward end 14. A transmission housing 16 supports a gear shaft 18 having main gears 20. Clutch collars 22 are supported on the shaft 18 adjacent to the main gears 20 for selectively engaging the main gears 20 for rotation with the shaft 18. A shift rail 24 supports a plurality of shift forks 26 that cooperate with the clutch collars 22 to move the collars 22 in and out of engagement with the gears 20 to shift the transmission 10. A shift sleeve 28 is connected to the shift rail 24 and receives an end of a stub lever 30. A shift lever 32 is connected to the stub lever 30, which is manipulated by the vehicle operator through a shift pattern P, shown in FIG. 1B. These manipulations translate and rotate the shift rail 24.

Figure 2:
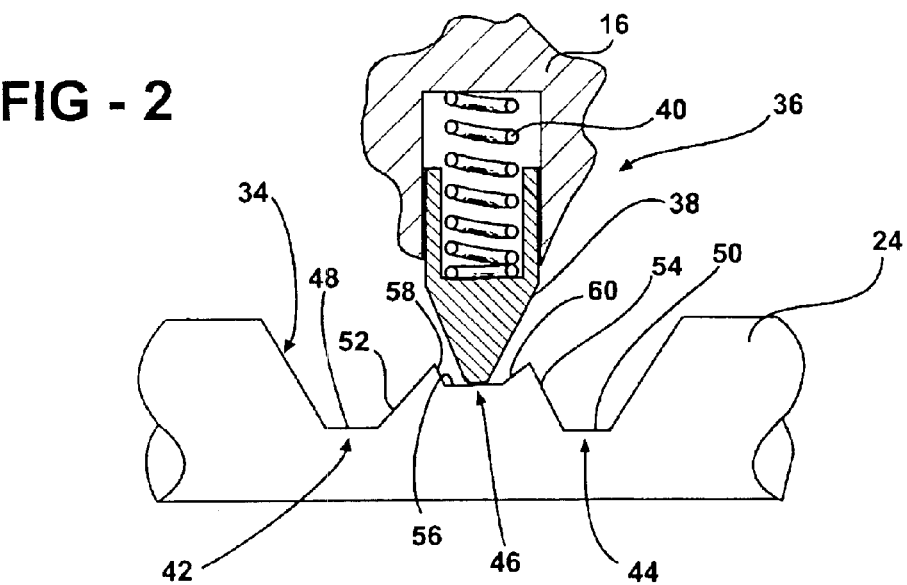
FIG. 2 is an enlarged cross-sectional view taken of the area indicated at 2 in FIG. 1A.

The shift pattern P includes first shift positions F, a neutral shift position N, and second shift positions S. Different gear positions within each shift position correspond to a different rotational position of the shift rail 24. The shift positions F, P, and N are defined by a contoured surface 34 on the shift rail 24, as shown in FIG. 2. The contoured surface 34 provides a shift feel and feedback to the operator when shifting the shift lever through the shift pattern P.

A detent assembly 36 includes a pin 38 biased toward the contoured surface 34 by a spring 40 having a constant spring rate. The detent assembly 36 may be received within a bore in the housing 16. Together the detent assembly 36 and contoured surface 34 retain the shift rail 24, and in turn a clutch collar 22 and main gear 20, in engagement with one another once the operator has selected a desired gear within a particular shift position. As discussed above, when the shift lever 32 is subjected to vibrations during vehicle operation, the detent assembly 36 and contoured surface 34 may not be able to maintain the shift rail 24 in the desired shift position, and the transmission 10 may jump out of gear.

To prevent jump out, the present invention includes an improved contoured surface 34 shaped in a manner to counteract the vibrations on the shift level 32.

The contoured surface 34 includes first 42, second 44, and neutral 46 recesses that respectively correspond to first F, second S, and neutral N positions. The first recess may include a first seat 48 that receives the pin 38 when the transmission is in one of the first shift positions F. The first recess 42 includes a first transition surface 52 adjoining the first seat 48 and sloping upwardly toward the neutral recess 46. The second recess 44 includes a second seat 50 receiving the pin 38 when the transmission 10 is in one of the second shift positions S. The second recess 44 includes a second transition surface 54 adjoining the second seat 50 and sloping upward toward the neutral recess 46. The neutral recess 46 includes a neutral seat 56, which may be arranged in an elevated manner relative to the first 48 and second 50 seats. The seats 48, 50, and 56 may be flat, as shown in the Figure.

For the shift lever 32 shown in FIG. 1A, vibrational force acting at the center of gravity of the shift lever 32 creates a tendency for the shift rail 24 to translate toward the rearward end 14. The first 52 and second 54 transition surfaces may be sloped differently than one another to counteract the effects of the vibrational force on the shift lever 32 and prevent jump out and to modify the shift feel for shift levers with different bends and centers of gravity. For example, the second transition surface 54 may be steeper than the first transition surface 52 to provide a similar shift feel to the operator when shifting from the second shift position S to the neutral position N as from the first shift position F to the neutral position N. In this way, the work done by the contoured surface or profile 34 on the spring 40 will be greater when shifting towards the forward end 12 than the rearward end 14.

The neutral recess may also be designed to provide different detent forces and to modify the shift feel through the neutral position. The neutral recess 46 may include a first neutral transition surface 58 sloping upward toward the first recess 42 and a second neutral transition surface 60 sloping upward toward the second recess 44. The first 58 and second 60 neutral transition surfaces adjoin the neutral seat 56 on opposing sides. The first neutral transition surface 58 may be steeper than the second neutral transition surface 60 such that the work done by the profile 34 on the spring 40 will be greater when shifting towards the forward end 12 than the rearward end 14. The steeper first neutral transition surface 58 may act as a stop for the pin 38 as it comes out of the second recess 44, which includes the steep second transition surface 54.

Figure 3:
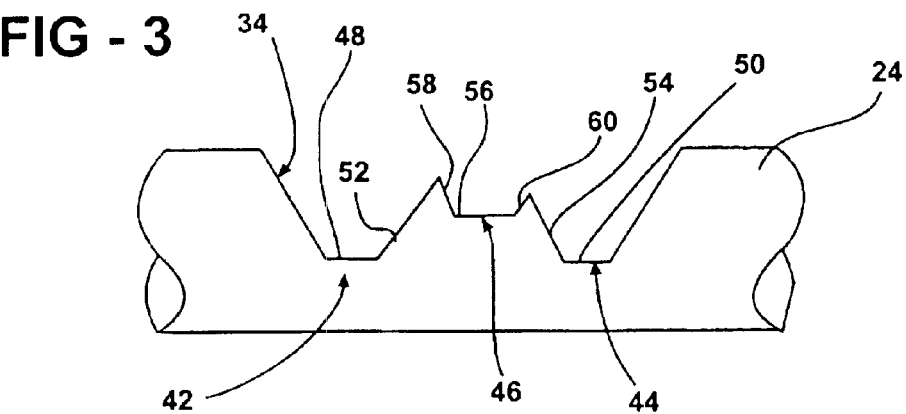
FIG. 3 is a view similar to FIG. 2 depicting an alternative embodiment.

Another profile 34 for a shift rail 24 is shown in FIG. 3. The neutral recess 46 is designed such that it is more difficult for the shift rail to be moved from the neutral recess 46 to the first recess 42. The peak formed by the first transition surface 52 and the first neutral transition surface 58 is higher than the peak formed by the second transition surface 54 and the second neutral transition surface 60. As a result, the work done by the profile 34 in the spring 40 will be greater when shifting toward the forward end 12 than the rearward end 14.

The slope of the transition surfaces may be changed in a manner other than shown to counteract the vibrational forces for the particular shift lever 32. The relative steepness could be reversed for a shift lever 32 whose center of gravity is rearward 14 of the stub lever 30 pivot. Furthermore, it should be understood that a detent assembly other than the assembly shown in the drawings may be used. Moreover, the contoured surface 34 may utilize a different shape than shown, that is, the surfaces and seats may be curved.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A detent assembly for a transmission comprising:
   a transmission component movable between a plurality of shift positions including first, second, and neutral shift positions;
   a contoured surface on said transmission component including first and second recesses respectively corresponding to said first and second shift positions, and a neutral recess arranged between said first and second recesses corresponding to said neutral shift position, said first and second recesses respectively including first and second transition surfaces sloping toward said neutral recess with said second transition surface being steeper than said first transition surface; and
   a detent assembly including a biasing member and a detent member with said biasing member urging said detent member into engagement with said contoured surface, said biasing member generating a first work along said first transition surface and a second work, along said second transition surface, greater than said first work.

2. The assembly according to claim 1, wherein said first and second transition surfaces are generally flat.

3. The assembly according to claim 1, wherein said first and second recesses respectively include first and second seats adjoining said first and second transition surfaces respectively coacting with said detent member while in said first and second shift positions respectively.

4. The assembly according to claim 3, wherein said first and second seats are generally flat.

5. The assembly according to claim 1, wherein said transmission component is a shift rail.

6. The assembly according to claim 1, wherein said biasing member is a spring having a constant spring rate.

7. The assembly according to claim 1, wherein said neutral recess includes first and second neutral transition surfaces, respectively, sloping toward said first and second recesses with said first neutral transition slope steeper than said second neutral transition slope, said biasing member generating a third work along said second neutral transition surface and a fourth work, along said first neutral transition surface, greater than said third work.

8. The assembly according to claim 7, wherein said neutral recess includes a neutral seat between said first and second neutral transition surfaces coacting with said detent member while in said neutral position.

9. The assembly according to claim 8, wherein said neutral seat is generally flat.

10. The assembly according to claim 1, wherein said neutral recess includes first and second neutral transition surfaces respectively sloping toward said first and second recesses, respectively, and forming first and second neutral peaks with said first neutral peak higher than said second neutral peak, said biasing member generating a third work along said second neutral transition surface and a fourth work, along said first neutral transition surface, greater than said third work.

11. A method of preventing jump out in a manual transmission comprising the steps of:
   a) producing a first detent work when moving from a first shift position to a third shift position; and
   b) producing a second detent work when moving from a second shift position to the third shift position with the second detent work greater than the first detent work wherein the third shift position is arranged between the first and second shift positions.

12. The method according to claim 11, wherein the third shift position corresponds to a neutral shift position.

13. The method according to claim 12, further including the steps of:
   c) producing a third detent work when moving from the neutral shift position to the second shift position; and
   d) producing a fourth detent work when moving from the neutral shift position to the first shift position with the fourth detent work greater than the third detent work.

* * * * *